United States Patent [19]

Miyakawa et al.

[11] Patent Number: 5,024,461
[45] Date of Patent: Jun. 18, 1991

[54] UPPER SUPPORT FOR SHOCK ABSORBER IN SUSPENSION SYSTEM, HAVING ELASTICALLY SUPPORTED RESONANCE MEMBER

[75] Inventors: Shinji Miyakawa, Komaki; Michio Ito, Inuyama, both of Japan

[73] Assignee: Tokai Rubber Industries, Ltd., Aichi, Japan

[21] Appl. No.: 554,876

[22] Filed: Jul. 20, 1990

[30] Foreign Application Priority Data

Jul. 25, 1989 [JP] Japan .............................. 1-87007[U]

[51] Int. Cl.[5] .................... B60G 11/62; F16F 13/00; F16F 15/04
[52] U.S. Cl. .................................. 280/710; 280/716; 267/35; 267/219; 267/140.1; 248/562
[58] Field of Search .................. 267/220, 140.1 A, 35; 188/378; 280/692, 697, 698, 716, 724, 710, 668, 673; 248/562

[56] References Cited

U.S. PATENT DOCUMENTS

| | | | |
|---|---|---|---|
| 4,786,036 | 11/1988 | Kanda | 248/562 |
| 4,789,144 | 12/1988 | Brenner | 267/35 |
| 4,877,262 | 10/1989 | Tanahashi et al. | 280/716 |
| 4,883,260 | 11/1989 | Kanda | 280/710 |
| 4,927,122 | 5/1990 | Brumme et al. | 248/562 |

FOREIGN PATENT DOCUMENTS

3436490 5/1986 Fed. Rep. of Germany .
3823238 2/1989 Fed. Rep. of Germany .
3839699 7/1989 Fed. Rep. of Germany .

Primary Examiner—Charles A. Marmor
Assistant Examiner—Tamara L. Finlay
Attorney, Agent, or Firm—Oliff & Berridge

[57] ABSTRACT

An upper support for a suspension system, having an inner and an outer rigid member, at least one generally annular elastic body interposed between the inner and outer rigid members for elastic connection therebetween, and which defines a generally annular fluid chamber that is filled with a non-compressible fluid. The upper support also includes an annular resonance member which is accommodated in the fluid chamber, and which is supported by one of the inner and outer rigid members so as to radially extend toward the other rigid member, so that the fluid chamber is substantially divided into two sections located on axially opposite sides of the resonance member. The upper support further includes a support device for elastically supporting the resonance member with respect to the above-indicated one of the inner and outer rigid members, such that the resonance member can be axially displaced relative to the one rigid member due to elastic deformation of the support device.

14 Claims, 5 Drawing Sheets

UPPER SUPPORT FOR SHOCK ABSORBER IN SUSPENSION SYSTEM, HAVING ELASTICALLY SUPPORTED RESONANCE MEMBER

BACKGROUND OF THE INVENTION

1. Field of the Invention

The present invention relates in general to an upper support used in a suspension system of a motor vehicle, for elastically connecting the body of the vehicle and a shock absorber of the suspension system, and more particularly to such an upper support which has significantly improved vibration-isolating capability.

2. Discussion of the Prior Art

In a conventional suspension system of a motor vehicle, a generally cylindrical upper support is usually interposed between the body of the vehicle, and a piston rod of a shock absorber which is linked with an axle or arm for supporting vehicle wheels. Such an upper support is adapted to prevent input vibrations received from the wheels through the shock absorber from being transmitted to the vehicle body, for example. The upper support usually includes a cylindrical inner rigid member to which the piston rod of the shock absorber is fixed, a cylindrical outer rigid member which is disposed radially outwardly of the inner rigid member and fixed to the vehicle body, and an elastic body interposed between the inner and outer rigid members for elastically connecting the two members.

The upper support of the above type is required to exhibit a relatively soft dynamic spring characteristic for improved vibration-isolating capability, for the purpose of preventing transmission of the vibrations from the shock absorber toward the vehicle body. At the same time, the elastic body of the upper support should have a high degree of stiffness so as to minimize the amount of deformation thereof against a static load applied thereto, for the purposes of avoiding changes in the attitude of the vehicle, and thus assuring high steering stability of the vehicle.

Namely, the upper support should provide a comparatively low dynamic spring constant for improved vibration-isolating capability, and a comparatively high static spring constant for assuring high steering stability of the vehicle. However, it is extremely difficult for the known upper support to fully satisfy the above requirements for the vibration-isolating capability and the steering stability, since the known upper support relies only upon the elastic deformation of the elastic body for isolating the input vibrations, and therefore cannot exhibit a sufficiently low dynamic spring constant together with a sufficiently high static spring constant.

In view of the above situation, there has been proposed a fluid-filled cylindrical upper support as disclosed in U.S. patent application Ser. No. 483,712 filed Feb. 23, 1990, which is assigned to the assignee of the present invention. The upper support disclosed therein has a fluid chamber filled with a non-compressible fluid and defined between the inner and outer rigid members which are elastically connected by the elastic body. The upper support further includes an annular resonance member, which is accommodated in the fluid chamber such that the resonance member radially extends from one of the inner and outer rigid members toward the other rigid member, so that the fluid chamber is divided into two sections located on the axially opposite sides of the resonance member. Upon application of a vibrational load between the inner and outer rigid members, pressures of the fluid in the two sections of the fluid chamber change relative to each other. Between a circumferential surface of the resonance member and an inner wall of the fluid chamber, there is formed a resonance portion which defines a fluid passage through which the fluid is forced to flow between the two sections upon application of the vibrational load. When the thus constructed upper support receives middle- to high-frequency vibrations to be isolated, the upper support provides a sufficiently lowered dynamic spring constant for isolating the vibrations, based on the resonance of the fluid flowing through the resonance portion, without significantly lowering the static spring constant of the upper support.

However, the upper support of the above type only exhibits a relatively low spring constant with respect to the vibrations having frequencies lower than the resonance frequency of the fluid flowing through the resonance portion as described above. When the upper support receives vibrations having frequencies higher than the resonance frequency, the flow resistance of the fluid passing through the resonance portion increases to such a high degree that the pressure in the two sections of the fluid chamber rises, resulting in an extremely increased dynamic spring constant of the upper support. For high-class luxury cars recently available on the market, in particular, the upper support is required to exhibit high isolating capability for vibrations having frequencies higher than the resonance frequency, so as to effectively reduce medium- to high-speed booming noises and road-oriented noises. Therefore, the upper support used in such high-class luxury cars has to avoid an extreme increase in its dynamic spring constant upon application of the vibrations having considerably high frequencies, while maintaining a low dynamic spring constant with respect to middle- to high-frequency vibrations, based on the resonance of the fluid flowing through the resonance portion.

SUMMARY OF THE INVENTION

It is accordingly an object of the present invention to provide an upper support for a suspension system of a motor vehicle, which is capable of exhibiting excellent vibration-isolating capability over a wide frequency range of input vibrations, assuring a low dynamic spring constant for middle- to high-frequency vibrations, based on the resonance of the fluid, while avoiding an extreme increase in the dynamic spring constant upon application of vibrations having frequencies higher than the resonance frequency of the fluid.

The above object may be attained according to the principle of the present invention, which provides an upper support for a suspension system, which is interposed between a body of a vehicle and a shock absorber of the vehicle, for elastically connecting the vehicle body and the shock absorber, comprising (a) a generally cylindrical inner rigid member to which the shock absorber is fixed, (b) a generally cylindrical outer rigid member which is disposed radially outwardly of the inner rigid member and fixed to the body of the vehicle, (c) at least one generally annular elastic body interposed between the inner and outer rigid members for elastically connecting the inner and outer rigid members, and for defining a generally annular fluid chamber between the inner and outer rigid members, the fluid chamber being filled with a non-compressible fluid, (d) an annular resonance member which is accommodated in the fluid chamber, and which is supported by one of the inner and outer rigid members so as to radially extend toward the other rigid member, so that the fluid chamber is substantially divided into two sections located on axially opposite sides of the resonance member. Upon application of a vibrational load between the inner and outer rigid members, pressures of the fluid in the two sections of the fluid chamber change relative to each other. The resonance member has a circumferential surface which cooperates with an inner wall surface of the elastic body to define a resonance portion through which the non-compressible fluid is forced to flow between the two sections upon application of the vibrational load. The upper support further includes support means for elastically supporting the resonance member with respect to the above-indicated one of the inner and outer rigid members, such that the resonance member can be axially displaced relative to the one rigid member due to elastic deformation of the support means.

The present upper support constructed as described above can exhibit excellent isolating characteristics for the input vibrations of a middle- to high-frequency range, owing to a sufficiently lowered dynamic spring constant based on the resonance of the fluid flowing through the resonance portion. Additionally, in the present upper support, the resonance member is elastically supported by a suitable support structure, such that the resonance member is axially displaceable with respect to the inner or outer rigid member, by a small axial distance due to elastic deformation of the support member. Therefore, even if the upper support receives the input vibrations having frequencies higher than the resonance frequency of the fluid in the resonance portion, which vibrations cause the fluid passage of the resonance portion to be substantially closed, the dynamic spring constant of the upper support is kept from being excessively increased, by means of axial displacement of the resonance member within the fluid chamber, which restrains or reduces pressure rise in the two sections of the fluid chamber.

Therefore, the upper support for a suspension system according to the present invention is capable of exhibiting excellent vibration-isolating capability over a wide frequency range of input vibrations, thanks to a low dynamic spring constant for middle- to high-frequency vibrations, based on the resonance of the fluid, while avoiding an undesired increase in the dynamic spring constant upon application of vibrations having frequencies higher than the resonance frequency of the fluid.

The above-indicated at least one generally annular elastic body may consist of a first and a second elastic body which cooperate to define the fluid chamber therebetween. In this case, the first and second elastic bodies have respective inner surfaces which face each other in the axial direction of the upper support and partially define the fluid chamber.

In one form of the present invention, the support means includes an annular boss formed on a radially inner portion of the inner surface of the first elastic body, and an annular recessed portion formed on a radially inner portion of the inner surface of the second elastic body. In this case, the resonance member is elastically supported by the radially inner portions of the inner surfaces of the first and second elastic bodies, with respect to the inner rigid member.

In another form of the invention, the inner surfaces of the first and second elastic bodies are generally tapered such that a distance between the inner surfaces gradually increases in the radially outward direction of the upper support, the support means includes radially inner portions of the generally tapered inner surfaces of the first and second elastic bodies. In this case, the resonance member is elastically supported by the radially inner portions with respect to the inner rigid member.

In a further form of the invention, the support means includes a pair of annular bosses which are formed on radially outer portions of the inner surfaces of the first and second elastic bodies. In this case, the resonance member is elastically supported by the radially outer portions with respect to the outer rigid member.

In a still further form of the invention, the inner surfaces of the first and second elastic bodies are generally tapered such that a distance between the inner surfaces gradually increases in the radially inward direction of the upper support, the support means includes radially outer portions of the inner surfaces of the first and second elastic bodies. In this case, the resonance member is elastically supported by the radially outer portions with respect to the outer rigid member.

The present upper support may further include an inner support member and an outer support member for supporting the second elastic body, such that the inner and outer support members are respectively fixed to the inner and outer rigid members to connect the second elastic body to the inner and outer rigid members.

Alternatively, the upper support may further include a pair of outer support members secured to outer circumferential surfaces of the first and second elastic bodies, for connecting the first and second elastic bodies to the outer rigid member.

BRIEF DESCRIPTION OF THE DRAWINGS

The above and optional objects, features and advantages of the present invention will be better understood by reading the following description of presently preferred embodiments of the invention, when considered in conjunction with the accompanying drawings, in which.

DETAILED DESCRIPTION OF THE PREFERRED EMBODIMENTS

Figure 1:
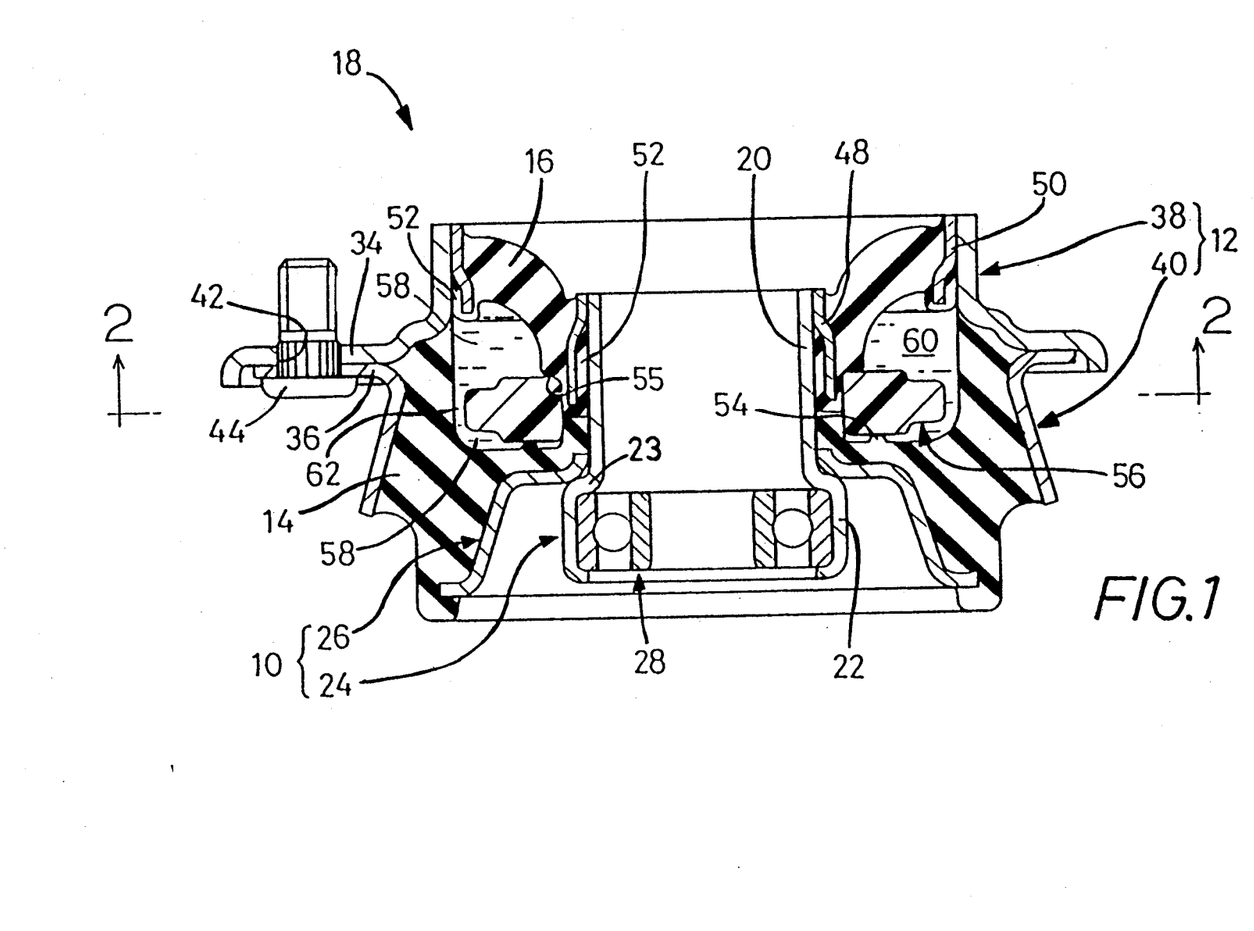
FIG. 1 is an elevational view in axial cross section of one embodiment of the present invention, in the form of an upper support used for a suspension system of a motor vehicle.
Figure 2:
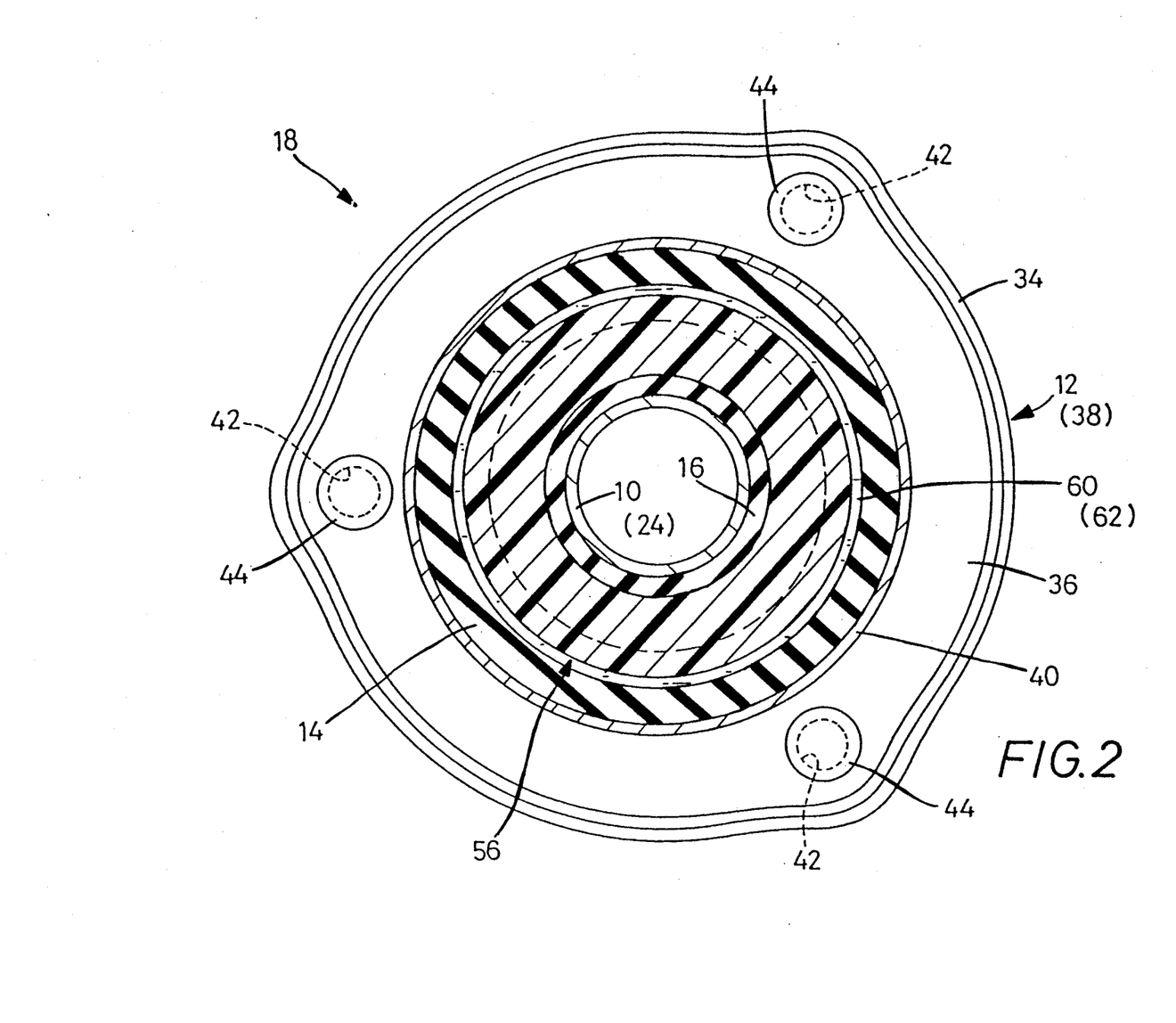
FIG. 2 is a transverse cross sectional view taken along line 2—2 of FIG. 1.

Referring first to FIGS. 1 and 2, there is illustrated a generally cylindrical upper support 18 used for a suspension system of a motor vehicle, which is constructed according to the present invention. In these figures, reference numeral 10 denotes a generally cylindrical inner rigid member in the form of an inner metal assembly, while reference numeral 12 denotes a generally cylindrical outer rigid member in the form of an outer metal assembly. The outer metal assembly 12 is disposed substantially coaxially with and radially outwardly of the inner metal assembly 10, with a suitable radial spacing therebetween. Between the inner and outer metal assemblies 10, 12, there are interposed a first and a second elastic body 14, 16 made of a suitable rubber material, for elastically connecting the inner and outer metal assemblies 10, 12. In the instant embodiment, the inner metal assembly 10 is fixed to a shock absorber (not shown) of the suspension system, while the outer metal assembly 12 is fixed to a body of the vehicle. Thus, the instant upper support 18 is interposed between the shock absorber and the vehicle body, for elastically connecting these members in a vibration damping and isolating manner.

More specifically described, the inner metal assembly 10 consists of a stepped inner member 24 having a generally cylindrical shape, and a tapered outer member 26. The stepped inner member 24 includes a small-diameter portion 20, a large-diameter portion 22 having a larger diameter than the portion 20, and a shoulder portion 23 connecting these portions 20, 22. The tapered outer member 26 is disposed radially outwardly of the large-diameter portion 22 of the inner member 24, such that the outer member 26 is welded at its one axial end having the smaller diameter, to the outer circumferential surface of the shoulder portion 23 of the inner member 24.

The stepped inner member 24 of the inner metal assembly 10 has a bearing 28 fitted in its large-diameter portion 22. The large-diameter portion 22 of the inner member 24 has an axial end portion which is caulked against an outer ring of the bearing 28, so that the bearing 28 is fixedly attached to the inner circumferential surface of the large-diameter portion 22. A piston rod (not shown) of the shock absorber is inserted through and fixedly supported by an inner ring of the bearing 28, so that the piston rod is attached to the inner metal assembly 10 (stepped inner member 24) such that the piston rod is rotatable about its axis relative to the inner metal assembly 10.

On the other hand, the outer metal assembly 12 consists of an upper and a lower cylindrical member 38, 40 which are fixed to each other so as to extend substantially in the axial direction of the upper support 18. The upper cylindrical member 38 has a radially outward flange 34 formed integrally at its one axial end adjacent to the lower cylindrical member 40, while the lower cylindrical member 40 has a radially outward flange 36 formed integrally at its one axial end adjacent to the upper cylindrical member 38. With these outward flanges 34, 36 being superposed on each other as shown in FIG. 1, the upper and lower cylindrical members 38, 40 are assembled relative to each other into the outer metal assembly 12, in a substantially coaxial or cocentric relation with each other. The thus superposed outward flanges 34, 36 have three holes 42 formed therethrough, which are substantially equally spaced apart from each other in the circumferential direction of the upper support 18, as shown in FIG. 2. The outer metal assembly 12 is secured to the vehicle body, by means of mounting bolts 44 which extend through the holes 42 formed through the assembly 12.

The thus constructed outer metal assembly 12 is disposed substantially coaxially with and radially outwardly of the inner metal assembly 10, with a suitable radial spacing therebetween. The first and second elastic bodies 14, 16 each having a generally annular or cylindrical shape are interposed between the inner and outer metal assemblies 10, 12, such that these elastic bodies 14, 16 are positioned in the respective lower and upper portions of the upper support 18. Thus, the inner and outer metal assemblies 10, 12 are integrally and elastically connected to each other, by the first and second elastic bodies 14, 16.

More specifically, the first elastic body 14 is disposed on the side of the large-diameter portion 22 of the stepped inner member 24, as viewed in the axial direction of the upper support 18. The first elastic body 14 is secured at its inner circumferential surface to the outer surfaces of the inner and outer members 24, 26 of the inner metal assembly 10, and at its outer circumferential surface to the inner surfaces of the upper and lower cylindrical members 38, 40 of the outer metal assembly 12, by means of vulcanization of the rubber material. Thus, the inner and outer metal assemblies 10, 12 and the first elastic body 14 cooperate to constitute a first intermediate product, which is prepared by vulcanizing an unvulcanized rubber material in a suitable mold, to form the elastic body 14 secured to the inner and outer metal assemblies 10, 12.

The second elastic body 16 is disposed on the side of the small-diameter portion 20 of the stepped inner member 24, as viewed in the axial direction of the upper support 18. The inner and outer circumferential surfaces of the second elastic body 16 are respectively secured by vulcanization to an inner and an outer support member 48, 50 each having a generally cylindrical shape. Thus, there is prepared a second intermediate product consisting of the second elastic body 16 and support members 48, 50. The first and second intermediate products are assembled such that the inner support member 48 is fitted on the axial end portion of the stepped inner member 24 which is remote from the large-diameter portion 22, while the outer support member 40 is fitted in the axial end portion of the upper cylindrical member 38 which is remote from the outward flange 34. Thus, the second elastic body 16 is interposed between the stepped inner member 20 and the upper cylindrical member 38, that is, the inner and outer metal assemblies 10, 12. Between the axially inner portions of the inner support member 48 and the stepped inner member 24, and between the axially inner portions of the outer support member 50 and the upper cylindrical member 38, there are provided respective sealing rubber layers 52 so as to ensure fluid tightness at the interface between the members 48, 24, and at the interface between the members 50, 38.

With the second intermediate product assembled to the first intermediate product consisting of the inner and outer metal assemblies 10, 12 and the first elastic body 14, an annular enclosed space is defined by the first and second elastic bodies 14, 16. This enclosed space extends over the entire circumference of the elastic bodies 14, 16, and is filled with a suitable non-compressible fluid to thereby provide an annular fluid chamber 60.

The filling of the fluid chamber 60 with the fluid may be conducted by assembling the above-described first and second intermediate products, within a mass of the fluid contained in a suitable vessel. For a sufficient degree of fluidity of the fluid, the non-compressible fluid contained in fluid chamber 60 has a kinematic viscosity of not higher than 1000 centistokes, preferably, not higher than 100 centistokes. The non-compressible fluid may be selected from the group which includes water, ethylene glycol, propylene glycol, or other alkylene glycols, polyalkylene glycol or silicone oil having a low kinematic viscosity, or a mixture thereof.

The first elastic body 14 has an integrally formed annular boss 54 having a predetermined height, which protrudes from a radially inner portion of a surface that partially defines the fluid chamber 60. This annular boss 54 extends over the entire circumference of the elastic body 14. On the other hand, the second elastic body 16 has an annular recess 55 which is formed in a radially inner portion of a surface that partially defines the fluid chamber 60. These annular boss 54 and annular recess 55 are both exposed to the fluid chamber 60, and are opposed to each other in the axial direction of the upper support 18.

When the second intermediate product including the second elastic body 16 is assembled to the first intermediate product including the first elastic body 14, a resonance member in the form of an annular resonance block 56 is accommodated within the fluid chamber 60 such that the resonance block 56 is interposed between the first and second elastic bodies 14, 16 in the radial direction of the upper support 18. This annular resonance block 56 has substantially the same inside diameter as that of the fluid chamber 60, and an outside diameter which is smaller by a suitable value than that of the fluid chamber 60. Further, the radially outer portion of the resonance block 56 has a relatively small axial dimensions or thickness as compared with the radially inner portion thereof. The resonance block 56 may be made of any material as long as it is unlikely to be deformed and is sufficiently resistant to corrosion by the fluid contained in the fluid chamber 60. For example, metal, resin and highly elastic rubber may be preferably used as the material of the resonance block 56.

The resonance block 56 provided within the fluid chamber 60 is supported by the first and second elastic bodies 14, 16, such that a radially inner portion of the block 56 is axially gripped by and between the annular boss 54 of the first elastic body 14 and a recessed portion of the second elastic body 16 which has the annular recess 55. Thus, the resonance block 56 is elastically supported by the first and second elastic bodies 14, 16 with respect to the inner metal assembly 10. In this arrangement, the fluid chamber 60 is substantially divided by the resonance block 56 into two sections 58, 58 located on the axially opposite sides of the resonance block 56. These two sections 58, 58 are held in fluid communication with each other, through an annular resonance portion 62 which is defined between the outer circumferential surface of the resonance block 56 and the inner surface of the first elastic body 14. The resonance portion 62 serves as a fluid passage which allows the fluid to flow therethrough between the two sections 58, 58 of the fluid chamber 60, upon application of a vibrational load. In the instant embodiment, the radially inner portions of the first and second elastic bodies 14, 16, which include the annular boss 54 and the annular recess 55, respectively, constitute means for elastically supporting the resonance block 56 with respect to the inner metal assembly 10, such that the resonance block 56 is displaceable by a small distance in the axial direction due to elastic deformation of the radially inner portions of the elastic bodies 14, 16.

In the thus constructed upper support 18, a static load applied through the shock absorber is received or supported by the first and second elastic bodies 14, 16. When a dynamic vibrational load is applied through the shock absorber, the inner and outer metal assemblies 10, 12 are displaced relative to each other in the axial direction thereof, due to elastic deformation of the elastic bodies 14, 16, whereby the fluid mass in the fluid chamber 60 provided between these metal assemblies 10, 12 is subjected to the vibrational load.

The resonance frequency of the fluid flowing through the resonance portion 62 is predetermined by tuning the dimensions of the resonance portion 62 in the fluid chamber 60. Where the dynamic vibrational load applied to the upper support 18 has a frequency lower than the predetermined resonance frequency, the relative displacement between the inner and outer metal assemblies 10, 12 causes the resonance block 56 in the fluid chamber 60 to be displaced synchronously with the inner metal assembly 10, whereby the fluid in the fluid chamber 60 is forced to repeatedly flow alternately in the opposite directions between the two sections 58, 58, through the resonance portion 60. Consequently, the instant upper support 18 exhibits a comparatively low spring constant, based on the resonance of the fluid flowing through the resonance portion 62.

Where the upper support 18 receives a vibrational load whose frequency is higher than the resonance frequency of the fluid flowing through the resonance portion 60, the resonance portion 60 acts as though the fluid passage provided by the resonance portion 60 were substantially closed, whereby pressure changes in the two sections 58 induced by the applied vibrational load cannot be absorbed or eliminated by the fluid flows through the resonance portion 62. In the instant upper support 18 wherein the resonance block 56 is elastically supported by the raised and recessed portions of the first and second rubber bodies 14, 16 having the annular boss 54 and annular recess 55, with respect to the inner metal assembly 10, the resonance block 56 is allowed to be displaced relative to the inner metal assembly 12, by a predetermined small distance in the axial direction of the upper support 18. Therefore, pressure rise in the two sections 58 due to the substantial closure of the resonance portion 62 is effectively restrained or eliminated based on the displacement of the resonance block 56 within the fluid chamber 60. Accordingly, the instant upper support 18 is able to avoid an extreme increase in its dynamic spring constant, even upon application of vibrations of considerably high frequencies, for which the upper support 18 cannot exhibit a low dynamic spring constant based on the resonance of the fluid flowing through the resonance portion 62.

Thus, for the middle- to high-frequency vibrations, the dynamic spring constant of the upper support 18 is effectively lowered based on the resonance of the fluid through the resonance portion 62, or the displacement of the resonance block 56 effectively prevents an increase in the dynamic spring constant. These dynamic spring characteristics for isolating the middle- to high-frequency vibrations will not affect static spring characteristics of the elastic bodies 14, 16, assuring a sufficient degree of static spring stiffness of the elastic bodies 14, 16.

It follows from the above description that the instant upper support 18 is used for achieving high degrees of vibration isolating effect and steering stability of the vehicle, and thereby assuring a significantly improved driving comfort of the vehicle.

In the upper support 18 of the instant embodiment, the outer circumferential surface of the resonance block 56 is brought into abutment with the first elastic body 14 located inside of the outer metal assembly 12, when the inner and outer metal assemblies 10, 12 are excessively displaced relative to each other in the radial directions thereof. Thus, the resonance block 56 also serves to limit an amount of relative displacement between the inner and outer metal assemblies 10, 12 in the radial directions thereof.

Figure 3:
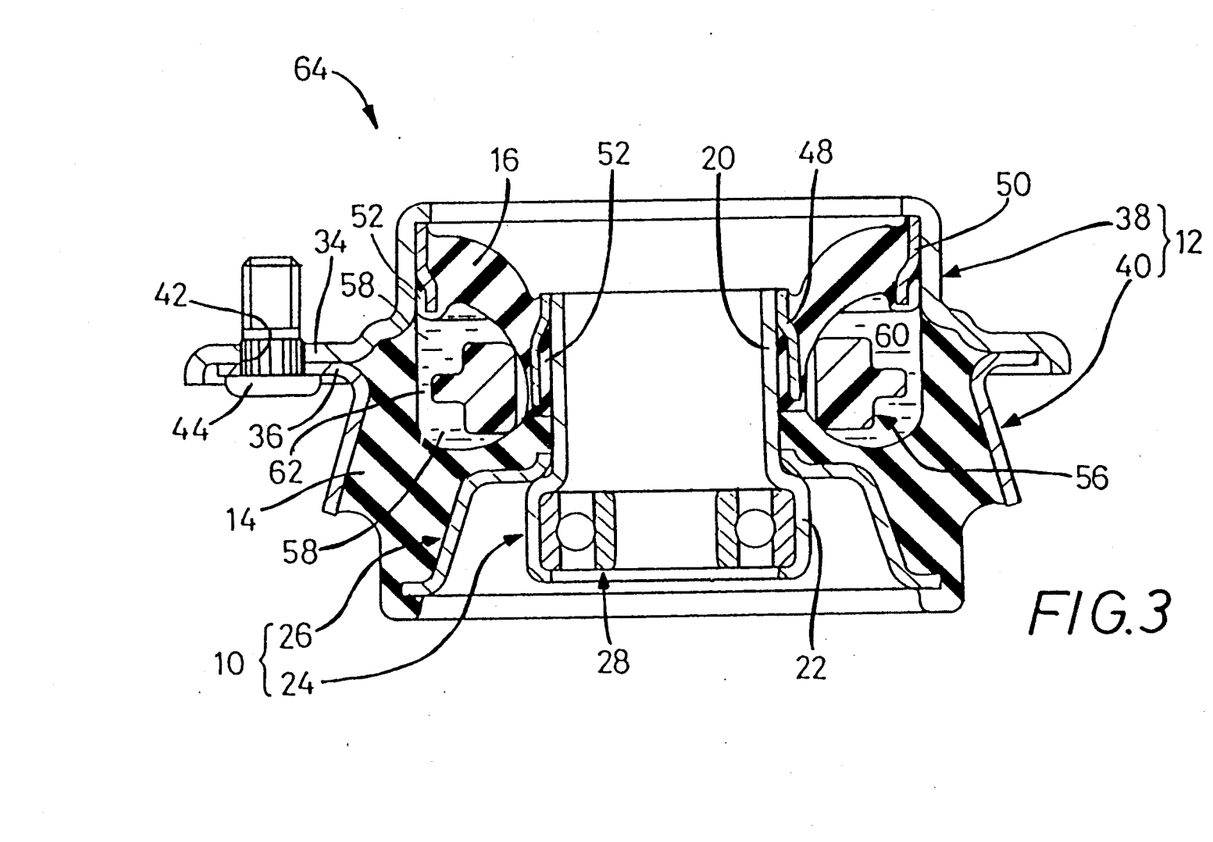
FIGS. 3 through 5 are axial cross sectional views corresponding to FIG. 1, showing other embodiments of the upper support according to the present invention.
Figure 4:
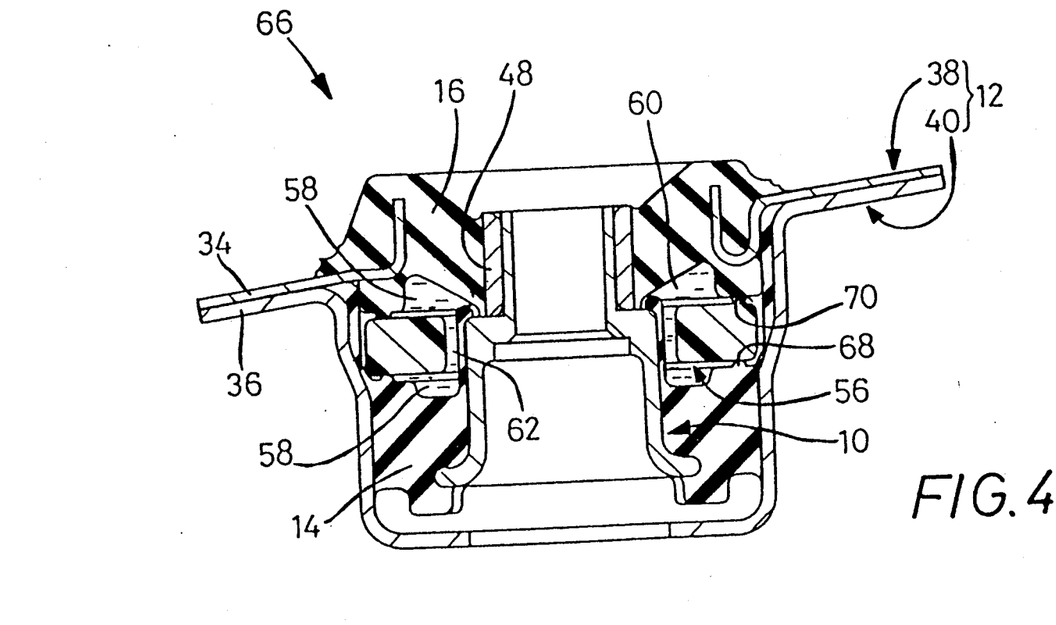
Figure 5:
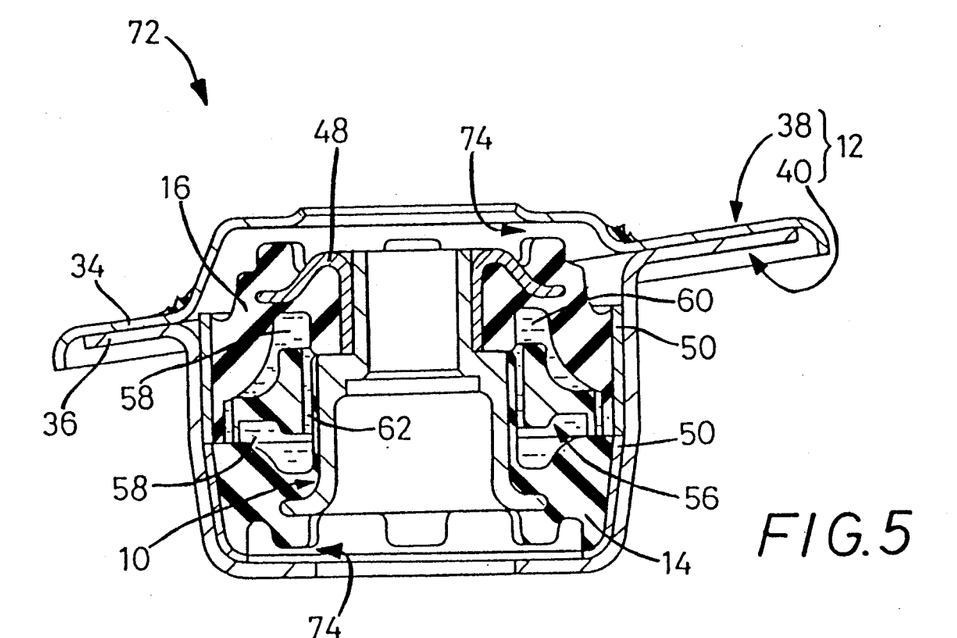

Referring next to FIGS. 3–5, there will be described other embodiments of the upper support according to the present invention. In these figures, the same reference numerals as used in the first embodiment of FIGS. 1–2 will be used for identifying structurally and/or functionally corresponding elements, and no redundant description of these elements will be provided.

FIG. 3 shows an upper support 64 in which the annular resonance block 56 is elastically supported with respect to the inner metal assembly 10, by a support structure different from that of the first embodiment of FIGS. 1 and 2. In this upper support 64, the first and second elastic bodies 14, 16 have respective tapered surfaces which face each other in the axial direction of the support 18 and partially define the fluid chamber 60. These surfaces of the first and second elastic bodies 14, 16 are tapered such that the axial distance therebetween gradually increases in the radially outward direction of the upper support 18. The resonance block 56 is held in contact at its inner circumference with the mutually facing surfaces of the first and second elastic bodies 14, 16, so that the resonance block 56 is positioned in the radially inner portion of the fluid chamber 60.

In the upper support 64 of the instant embodiment, the radially inner portions of the axially facing surfaces of the first and second elastic bodies 14, 16 constitute means for elastically supporting the resonance block 56 with respect to the inner metal assembly 10.

Upon application of middle- to high-frequency vibrations, the thus constructed upper support 64 provides an effectively lowered dynamic spring constant, based on the resonance of the fluid flowing through the resonance portion 62. Even if the upper support 64 receives a vibrational load whose frequency is higher than the resonance frequency of the fluid in the resonance portion 62, the upper support 64 does not suffer from unfavorable pressure rise in the two sections 58 of the fluid chamber 60, since the pressure rise may be absorbed or reduced by the displacement of the resonance block 56, as in the first embodiment as described above.

FIG. 4 shows an upper support 66 in which the resonance block 56 is supported by a support structure different from those of the first and second embodiments of FIGS. 1-2 and FIG. 3. In this embodiment, the resonance block 56 in the form of an annular member has an inside diameter which is larger by a suitable value than that of the fluid chamber 60, and substantially the same outside diameter as that of the fluid chamber 60. The resonance block 56 has an inner circumferential surface which cooperates with the inner surface of the first elastic body 14 to define the resonance portion 62. The first and second elastic bodies 14, 16 have respective integrally formed annular bosses 68, 70 each having a predetermined height, which protrude from radially outer portions of mutually axially facing surfaces of the elastic bodies 14, 16, into the fluid chamber 60. These annular bosses 68, 70 extend over the entire circumference of the elastic bodies 14, 16, and are opposed to each other in the axial direction of the upper support 66.

The resonance block 56 accommodated within the fluid chamber 60 is axially gripped at a radially outer portion thereof by and between the annular bosses 68, 70, so that the resonance block 56 is elastically supported by the first and second elastic bodies 14, 16 with respect to the outer metal assembly 12. In the instant embodiment, therefore, the first and second elastic bodies 14, 16, which include the respective annular bosses 68, 70, constitute means for elastically supporting the resonance block 56 with respect to the outer metal assembly 12.

In the upper support 66 of the instant embodiment, the upper cylindrical member 38 of the outer metal assembly 12 is secured by vulcanization to the second elastic body 16, while the lower cylindrical member 40 is secured by vulcanization to the outer circumferential surface of the first elastic body 14. For assembling the upper and lower cylindrical members 38, 40 into the outer metal assembly 12, the outward flanges 34, 36 are superposed on each other, and fixed to each other by welding, for example.

The thus constructed upper support 66 exhibits excellent vibration isolating capability, like the upper support 18 of the first embodiment. Further, the present upper support 66 can be easily assembled within a mass of the fluid, by press-fitting the inner metal assembly 10 into the first and second elastic bodies 14, 16 while the upper and lower cylindrical members 38, 40 are temporarily fixed to each other. Thereafter, the upper and lower cylindrical members 38, 40 are welded together in the atmosphere. Thus, the instant upper support 66 is advantageous in terms of the assembling procedure.

FIG. 5 shows an upper support 72 in which the annular resonance block 56 is supported by a support structure still different from those of the preceding embodiments. In this upper support 72, the first and second elastic bodies 14, 16 have mutually axially facing surfaces which partially define the fluid chamber 60. These surfaces of the first and second elastic bodies 14, 16 are generally tapered such that the axial distance therebetween gradually increases in the radially inward direction of the upper support 18. The resonance block 56 is axially gripped at a radially outer portion thereof by and between the axially facing surfaces of the first and second elastic bodies 14, 16, so that the resonance block 56 is supported at a radially outer portion of the fluid chamber 60.

In the upper support 72 of the instant embodiment, the radially outer portions of the axially facing surfaces of the first and second elastic bodies 14, 16 constitute means for elastically supporting the resonance block 56 with respect to the outer metal assembly 12.

The upper support 72 has two outer support members 50, 50, which are secured by vulcanization to the respective outer circumferential surfaces of the first and second elastic bodies 14, 16. With these outer support members 50, 50 being press-fitted in the lower cylindrical member 40 of the outer metal assembly 12, the first and second elastic bodies 14, 16 are assembled together to thereby define the fluid chamber 60 therebetween.

The thus constructed upper support 72 provides excellent vibration isolating effect as provided by the upper support 18 of the first embodiment. Further, the instant upper support 72 has stopper portions 74, 74 for limiting an amount of relative displacement between the inner and outer metal assemblies 10, 12 in the axial direction thereof. These stopper portions 74, 74 are formed as integral parts of the first and second elastic bodies 14, 16, which protrude outward from the axially opposite end faces of the elastic bodies 14, 16 which are not exposed to the fluid chamber 60. Since the outer metal assembly 12 is prepared independently of the first and second elastic bodies 10, 12, the stopper portions 74, 74 may be easily formed on the first and second elastic bodies 14, 16, when the elastic bodies 14, 16 are molded such that the elastic bodies 14, 16 are secured to the outer support members 50, 50.

While the present invention has been described in its presently preferred embodiments, for illustrative purpose only, it is to be understood that the invention is not limited to the details of the illustrated embodiments, but may be otherwise embodied.

For example, the support structure for elastically supporting the resonance block 56 with respect to the inner or outer metal assembly 10, 12 may be constituted by an elastic member or members which is/are formed separately from or independently of the first and second elastic bodies 14, 16.

Although the resonance block 56 is held in contact with the axially facing surfaces of the elastic bodies 14, 16 in the illustrated embodiments, an axial clearance may be provided between the resonance block 56 and the relevant surfaces of the first and second elastic bodies 14, 16 (or other elastically supporting members), provided that the resonance block 56 is stopped and elastically supported by the relevant surfaces after a small distance of axial displacement of the resonance block 56. If the axial clearance is excessively large, however, the axial displacement of the resonance block 56 considerably absorbs the pressure changes in the two sections 58 of the fluid chamber 60 and thereby prevent sufficient flows of the fluid through the resonance portion 62, even when the upper support receives middle- to high-frequency vibrations which should be isolated by the resonance of the fluid in the resonance portion 62. In view of the above, the axial clearance between the resonance block 56 and the relevant surfaces of the elastically supporting members should be determined so that the pressure changes in the two sections 58 caused by the middle- to high-frequency vibrations may not be considerably absorbed by the axial movements of the resonance block 56.

It will be understood that the present invention may be embodied with various other changes, modifications and improvements, which may occur to those skilled in the art, without departing from the spirit and scope of the invention defined in the following claims.

What is claimed is:

1. An upper support for a suspension system, which is interposed between a body of a vehicle and a shock absorber of the vehicle, for elastically connecting the vehicle body and the shock absorber, comprising:

a generally cylindrical inner rigid member to which said shock absorber is fixed;

a generally cylindrical outer rigid member which is disposed radially outwardly of said inner rigid member and fixed t said body of the vehicle;

at least one generally annular elastic body interposed between said inner and outer rigid members for elastically connecting the inner and outer rigid members, said at least one elastic body defining a generally annular fluid chamber between the inner and outer rigid members, said fluid chamber being filled with a non-compressible fluid;

an annular resonance member which is accommodated in said fluid chamber, and which is supported by one of the inner and outer rigid members so as to radially extend toward the other of the inner and outer rigid members, so that said fluid chamber is substantially divided into two sections located on axially opposite sides of said resonance member, pressures of said fluid in said two sections changing relative to each other upon application of a vibrational load between said inner and outer rigid members, said resonance member having a circumferential surface which cooperates with an inner wall surface of said at least one elastic body to define a resonance portion through which said non-compressible fluid is forced to flow between said two sections upon application of the vibrational load; and support means for elastically supporting said resonance member with respect to said one of the inner and outer rigid members, such that said resonance member can be aixally displaced relative to said one rigid member due to elastic deformation of said support means.

2. An upper support according to claim 1, wherein said at least one generally annular elastic body comprises a first and a second elastic body which cooperate to define said fluid chamber therebetween, said first and second elastic bodies having respective inner surfaces which face each other in the axial direction of the upper support and partially define said fluid chamber.

3. An upper support according to claim 2, wherein said support means comprises an annular boss formed on a radially inner portion of said inner surface of said first elastic body, and an annular recessed portion formed on a radially inner portion of said inner surface of said second elastic body, said resonance member being elastically supported by said radially inner portions of said inner surfaces of said first and second elastic bodies, with respect to said inner rigid member.

4. An upper support according to claim 3, wherein said resonance member is held in contact with said annular boss and said annular recessed portion, and thereby elastically supported with respect to said inner rigid member.

5. An upper support according to claim 2, wherein said inner surfaces of the first and second elastic bodies are generally tapered such that a distance between said inner surfaces gradually increases in the radially outward direction of the upper support, said support means comprising radially inner portions of said generally tapered inner surfaces of the first and second elastic bodies, said resonance member being elastically supported by said radially inner portions with respect to said inner rigid member.

6. An upper support according to claim 5, wherein said resonance member is held in contact with said radially inner portions of said tapered inner surfaces of said first and second elastic bodies, and thereby elastically supported with respect to said inner rigid member.

7. An upper support according to claim 2, wherein said support means comprises a pair of annular bosses which are formed on radially outer portions of said inner surfaces of the first and second elastic bodies, said resonance member being elastically supported by said radially outer portions with respect to said outer rigid member.

8. An upper support according to claim 7, wherein said resonance member is held in contact with said pair of annular bosses, and thereby elastically supported with respect to said outer rigid member.

9. An upper support according to claim 2, wherein said inner surfaces of the first and second elastic bodies are generally tapered such that a distance between said inner surfaces gradually increases in the radially inward direction of the upper support, said support means comprising radially outer portions of said inner surfaces of the first and second elastic bodies, said resonance member being elastically supported by said radially outer portions with respect to said outer rigid member.

10. An upper support according to claim 9, wherein said resonance member is held in contact with said radially outer portions, and thereby elastically supported with respect to said outer rigid member.

11. An upper support according to claim 2, further comprising an inner support member and an outer support member for supporting said second elastic body, such that said inner and outer support members are respectively fixed to said inner and outer rigid members to connect said second elastic body to the inner and outer rigid members.

12. An upper support according to claim 2, further comprising a pair of outer support members secured to outer circumferential surfaces of said first and second elastic bodies, for connecting the first and second elastic bodies to said outer rigid member.

13. An upper support according to claim 1, wherein said non-compressible fluid has a kinematic viscosity of not higher than 1000 centistokes.

14. An upper support according to claim 13, wherein said non-compressible fluid has a kinematic viscosity of not higher than 100 centistokes.

* * * * *